United States Patent

[11] 3,587,975

| [72] | Inventor | John W. Moffett |
| | | 126 Chester Pike, Ridley Park, Pa. 19078 |
| [21] | Appl. No. | 48,301 |
| [22] | Filed | June 22, 1970 |
| [45] | Patented | June 28, 1971 |

[54] AERATING ROTARY FILTER SWEEP
3 Claims, 2 Drawing Figs.

[52] U.S. Cl. ................................................. 239/428.5,
210/272, 210/273, 239/254, 239/550
[51] Int. Cl. ........................................................ E03c 1/084
[50] Field of Search .......................................... 210/80,
271, 272, 273; 239/254, 428.5, 550, 602

[56] References Cited
UNITED STATES PATENTS
| 3,374,896 | 3/1968 | Palmer et al. .................. | 210/272 |
| 3,405,872 | 10/1968 | Stuart, Sr. ..................... | 239/254 |

*Primary Examiner*—Samih N. Zaharna
*Attorney*—Barry Moyerman

ABSTRACT: A rotary sweep, used in backwashing of particulate filter beds, preferably of the reactively driven type, is provided with apparatus to cause it to discharge jets of aerated water. Such aerated water enhances the scrubbing action and, when the sweep is reactively driven, increases the reactive forces. Means for aerating the water comprise a plurality of eductors mounted on each of the radially extending sweep arms. These are provided with atmospheric air despite the fact that, during the backwash operation, they are submerged.

INVENTOR
JOHN W. MOFFETT

BY Berry Moyerman
ATTORNEY

3,587,975

AERATING ROTARY FILTER SWEEP

BACKGROUND OF THE INVENTION

1. Field of the Invention

The invention pertains to rotary liquid distributors which are associated with particulate filter beds. More particularly, it pertains to rotary filter sweeps of the type used during backwashing of filter beds to agitate and scrub the particulate material therein.

2. Prior Art

Rotary filter sweeps are customarily used in connection with the backwash cycle of particulate bed filters such as, for example, sand and gravel filters. They frequently comprise a pair of opposed radially extending arms which are rotatably mounted on a central suspension. Some of these devices are driven by reactive forces and others are positively rotated. A good example of a prior art filter sweep is that shown in U.S. Pat. No. 3,288,297.

The importance of enhancing the scrubbing action induced by the sweep has long been recognized and solutions have been proposed, as in U.S. Pat. No. 3,351,292, which contemplate a recirculation of the liquid stratum within which particulate material is suspended. While aspirators have been used in conjunction with sweeps, as in U.S. Pat. No. 3,405,872, there seems to have been no recognition of the benefits which accrue from the discharge of aerated water from the sweep arms with aeration occurring in situ at each nozzle location.

SUMMARY OF THE INVENTION

The invention comprises a device for the efficient backwashing of particulate filters. Briefly, it is a rotary sweep—preferably of the type driven by reactive forces—which utilizes a plurality of eductors mounted along its radial arms instead of the mere nozzles of the prior art. Since operation is submerged during backwash, air is provided to each eductor nozzle by means of a manifold. This manifold is supplied with atmospheric air from a breather tube which extends above the liquid level. The ratio of air to water issuing from the eductors can be adjusted by valving the breather tube.

Each eductor discharges a stream of aerated water. The water creates a greater scouring action than nonaerated water and is thus more effective in cleansing the particulate material of which the filter bed is composed. Further, it has been found that, when the sweeps in question are of the reactively driven type, the jets of aerated water issuing from the eductor produce reactive forces which are much greater than those produced by nonaerated water.

Accordingly, it is an object of the invention to provide an efficient rotary sweep which produces a thorough scouring action and is driven by enhanced reactive forces.

An additional object of the invention is to provide a sweep which produces aerated water, which is rugged in construction, has a minimum of moving parts, is easy to maintain, economic to build and effective in its scouring action.

Other objects of the invention will be apparent to those skilled in the art from a consideration of the description of an exemplary embodiment thereof which follows. It should be appreciated that the foregoing abstract and summary are intended as tools for information retrieval and are not included for purposes of limiting or interpreting the true scope of the invention. This is the function only of the appended claims.

DESCRIPTION OF THE DRAWING

In the drawing, wherein like reference letters and numerals designate, respectively, like assemblies and parts.

DETAILED DESCRIPTION OF A PREFERRED EMBODIMENT

Figure 1:
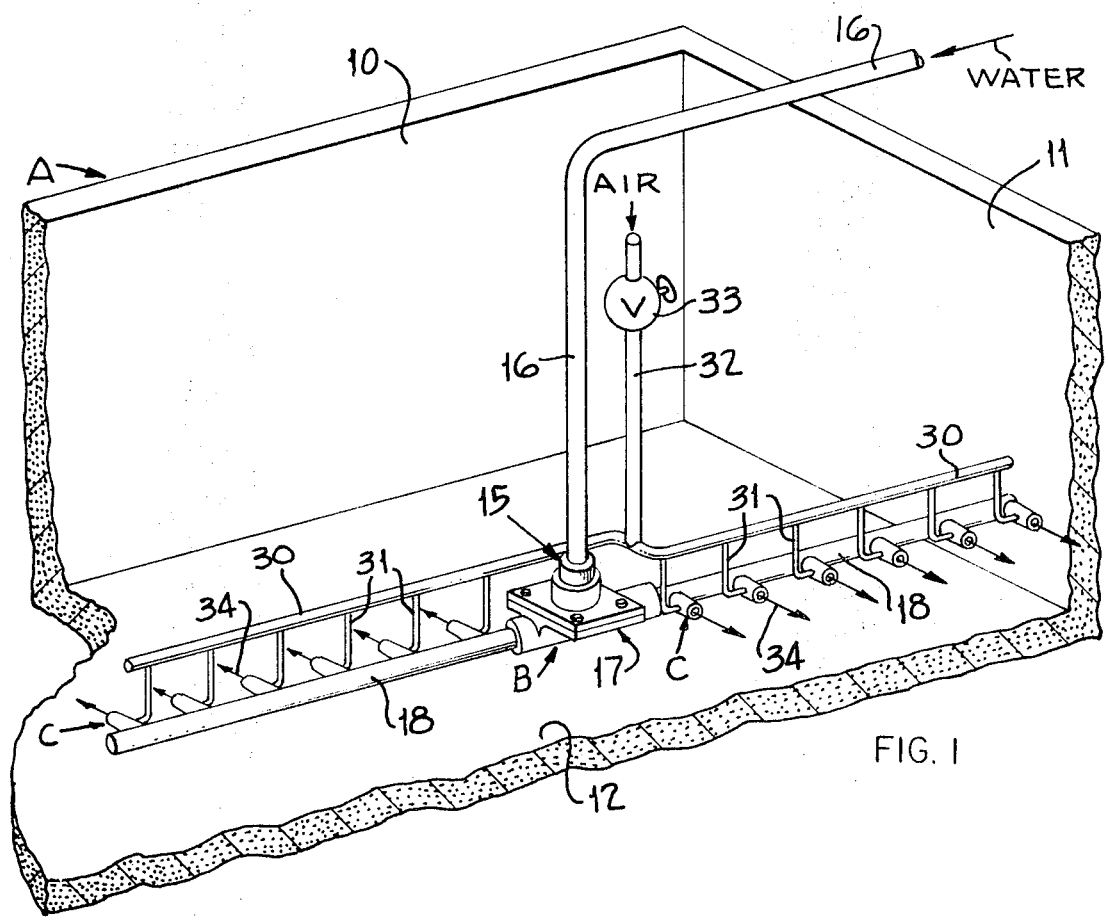
FIG. 1 represents a fragmentary perspective view of a rotary filter sweep embodying the invention.
Figure 2:
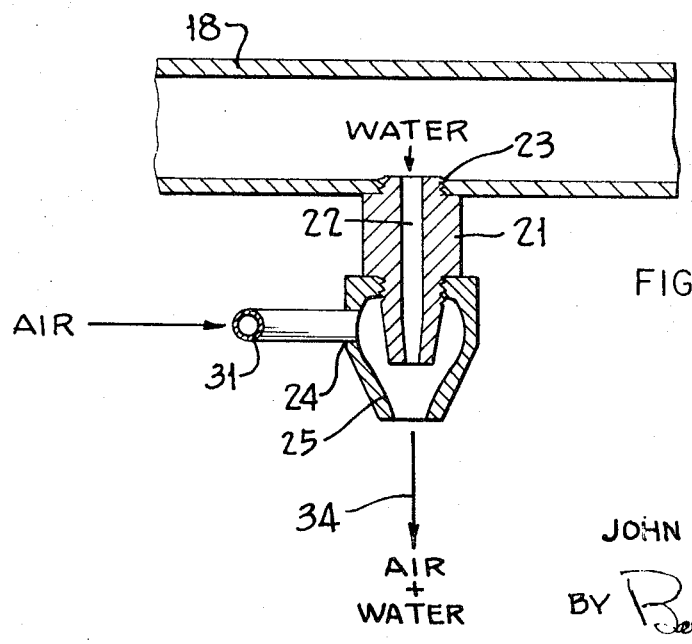
FIG. 2 represents a fragmentary section showing details of an eductor as mounted on an arm of the sweep of FIG. 1.

As shown in FIG. 1, a reactively driven rotary sweep is mounted for backwashing a particulate bed filter, generally A. The filter includes walls 10 and 11 as well as a bottom 12. Details of the underdrain system, troughs, the particulate materials themselves and other conventional components form no part of the invention and are, consequently, not shown.

The rotary sweep includes a suspension joint, generally B, which may be, for example, of the type shown in U.S. Pat. No. 2,903,278. These joints include a stationary portion 15 which is mounted on an supported by a backwash water feedline 16. This line delivers high-pressure (i.e. preferably above 20 p.s.i.g.) water to the sweep. A rotating portion 17 is mounted on portion 15 and provides cantilevered support for a pair of opposed radially extending tubular sweep arms 18. These are generally made of pipe and water flows into them from line 16 via suspension joint B.

Each arm is provided with a plurality of eductors, generally C. In the particular embodiment shown, the eductor comprises a hollow body 20 which is mounted on a nipple 21, provided with a restrictive axial orifice 22. Nipple 21 is threadedly mounted on arm 18 at predetermined drilled and tapped locations 23. Orifice 22 may be suitably tapered to provide a jet of water into the interior of the body 20. Such a jet, in accordance with known principles of hydraulics, produces a vena contracta which causes a reduction in surrounding pressure. Suction port 24, located downstream of the internal restriction, is thus subject to a subatmospheric pressure whereby air is drawn through it into the interior of body 20. The air is mixed with water leaving orifice 22 and aerated stream is shaped by a venturi discharge nozzle 25.

When the filter A is being backwashed, the water level is above the sweep, as indicated in FIG. 1. Obviously, the suction ports 24 would be flooded and no aeration would be possible, were no provision made for a supply of atmospheric air. Air is supplied by a manifold arrangement which includes a header 30, which may be made up in sections, and a plurality of laterals 31, one for each eductor C. The header 30 is supplied by a breather tube 32 which may be valved as at 33. The entire manifold arrangement rotates with the sweep and breather tube 32 describes an orbit about the vertical portion of feedline 16. Its height is such that it passes under the horizontal run of line 16. Other arrangements are possible including a breather tube which passes axially through or is integral with suspension B and is concentrically mounted in line 16 until it separates at some point above the water level in the filter. By the use of valve 33, the ratio of air to water in the jet of aerated water 34 may be varied to produce the desired degree of scrubbing action and also to vary the reactive forces.

Within the framework of the inventive concepts described above, many modifications and variations are possible. Therefore, the invention is not to be construed as limited to the details disclosed in the foregoing specific embodiment. Its metes and bounds are rather to be determined by a reasonable interpretation of the claims in light of the concepts disclosed.

I claim:

1. In a rotary sweep for distributing backwash water across the top of a filter bed to scrub and agitate particles of solid filtering material, which operates in a submerged condition, and which includes a plurality of radially extending tubular arms which are supplied with high-pressure water, the improvement which comprises:

a plurality of eductors mounted on said arms, each of said eductors including a suction port into which air is drawn and a discharge nozzle which discharges a shaped stream of aerated water into the bed;

a manifold linking the suction ports of the eductors; and a breather tube extending vertically upward from said manifold to a point above the liquid level, which breather supplies the manifold with atmospheric air;

whereby the agitation of the bed is increased compared to that which would occur with nonaerated water.

2. The sweep of claim 1 wherein said breather tube is provided with a valve, by means of which the ratio of air to water in the discharge of the eductors can be varied.

3. The sweep of claim 1 wherein said eductors comprise a hollow body having a backwash water inlet, a suction port and an aerated backwash water discharge nozzle, said body further including an internal restriction through which backwash water flows, said suction port being located downstream from said internal restriction and the vena contracta caused by flow through said restriction creating the vacuum which draws air into the interior of said body, said discharge nozzle having a venturi cross section to shape the jet of aerated water which is discharged.